(12) United States Patent
Dreher

(10) Patent No.: US 10,202,973 B1
(45) Date of Patent: Feb. 12, 2019

(54) INTELLIGENT FORCE REDUCING DOUBLE-ACTING COUNTERWEIGHT

(71) Applicant: George R Dreher, Midland, TX (US)

(72) Inventor: George R Dreher, Midland, TX (US)

(*) Notice: Subject to any disclaimer, the term of this patent is extended or adjusted under 35 U.S.C. 154(b) by 0 days.

(21) Appl. No.: 15/719,964

(22) Filed: Sep. 29, 2017

Related U.S. Application Data

(60) Provisional application No. 62/535,945, filed on Jul. 23, 2017, provisional application No. 62/426,337, filed on Nov. 25, 2016, provisional application No. 62/421,410, filed on Nov. 14, 2016, provisional application No. 62/411,556, filed on Oct. 22, 2016, provisional application No. 62/403,165, filed on Oct. 2, 2016, provisional application No. 62/535,846, filed on Jul. 22, 2017.

(51) Int. Cl.
| | |
|---|---|
| *F04B 47/00* | (2006.01) |
| *F04B 47/14* | (2006.01) |
| *E21B 43/12* | (2006.01) |
| *E21B 47/00* | (2012.01) |
| *G05B 19/406* | (2006.01) |
| *G05B 19/402* | (2006.01) |

(52) U.S. Cl.
CPC .......... *F04B 47/145* (2013.01); *E21B 43/127* (2013.01); *E21B 47/0008* (2013.01); *G05B 19/402* (2013.01); *G05B 19/406* (2013.01); *E21B 2043/125* (2013.01); *G05B 2219/31313* (2013.01)

(58) Field of Classification Search
CPC ...... F04B 47/14; F04B 47/145; F04B 47/022; F04B 2201/1211; E21B 43/127; E21B 2043/125
See application file for complete search history.

(56) References Cited

U.S. PATENT DOCUMENTS

| | | | | |
|---|---|---|---|---|
| 1,706,407 | A * | 3/1929 | Miller | F04B 47/14 74/589 |
| 2,432,735 | A * | 12/1947 | Downing | F04B 47/04 417/904 |
| 2,995,048 | A * | 8/1961 | Mitchell | F16F 15/28 74/590 |
| 5,051,058 | A * | 9/1991 | Roth | B65G 57/035 414/676 |
| 5,528,947 | A * | 6/1996 | Wang | F04B 47/14 417/218 |
| 2011/0314959 | A1* | 12/2011 | Smith | F04B 47/14 74/590 |

* cited by examiner

*Primary Examiner* — Blake A Tankersley

(57) ABSTRACT

A movable counterweight that can reduce lifting and lowering torque. In one embodiment, a beam pumping unit can have a movable beam counterweight attached to a positioning drive on the beam and can be intelligently positioned to achieve lowest net torque required by one or more of a prime mover and lowest net gear torque in in the speed reducer. Optionally, positioning can be calculated by one or more of monitoring current requirements of the motor and monitoring the beam load with a load cell, which can then be merged with crank position readings and processed into signals sent to the positioning drive, which causes the counterweight to move to the best position along the on the length of the beam to achieve one or more of near to lowest current draw by the prime mover and lowest net gear torque in in the speed reducer.

30 Claims, 12 Drawing Sheets

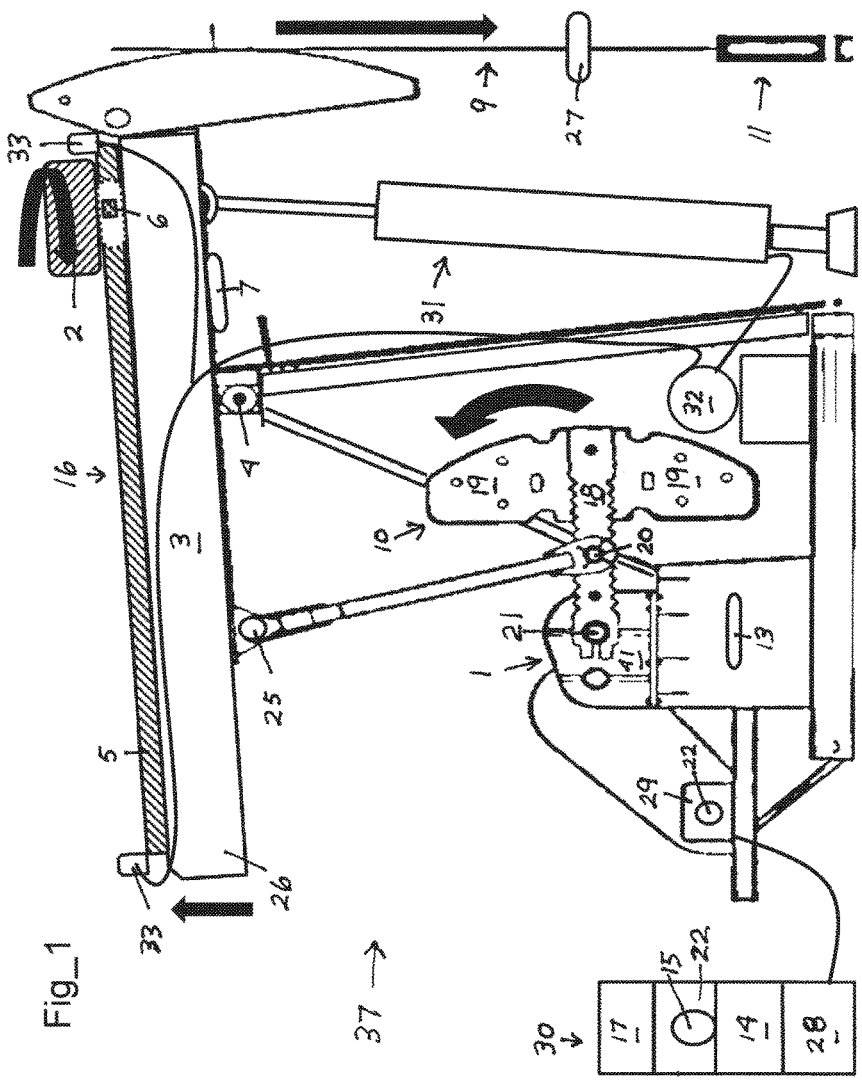

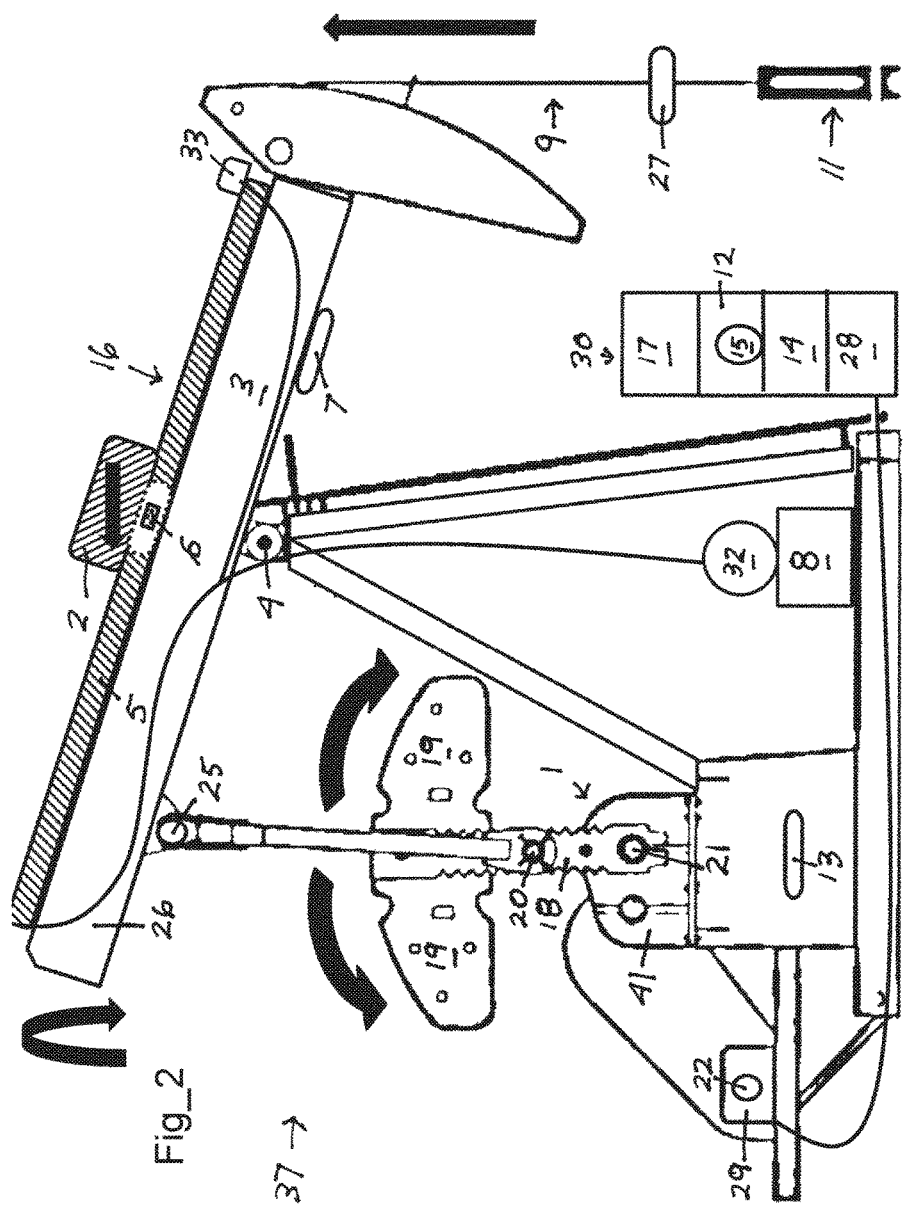

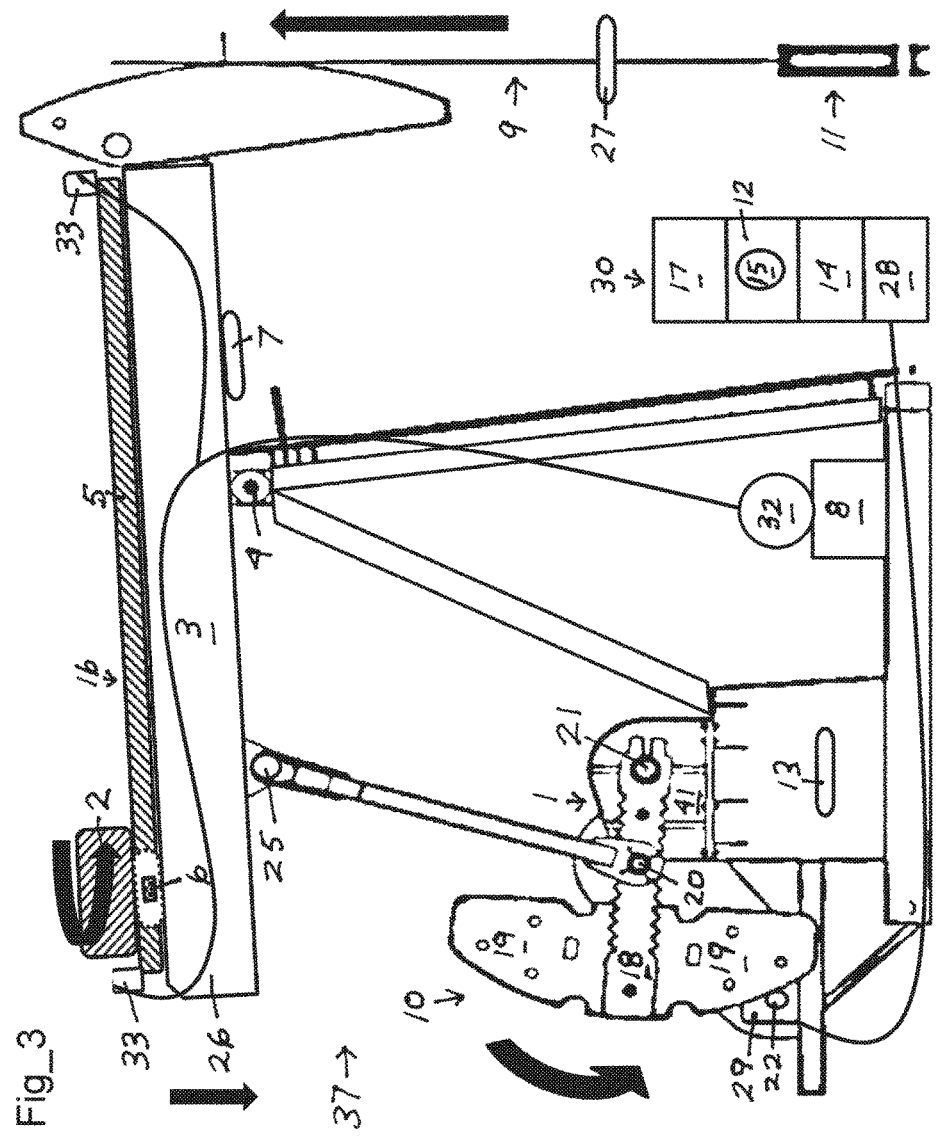

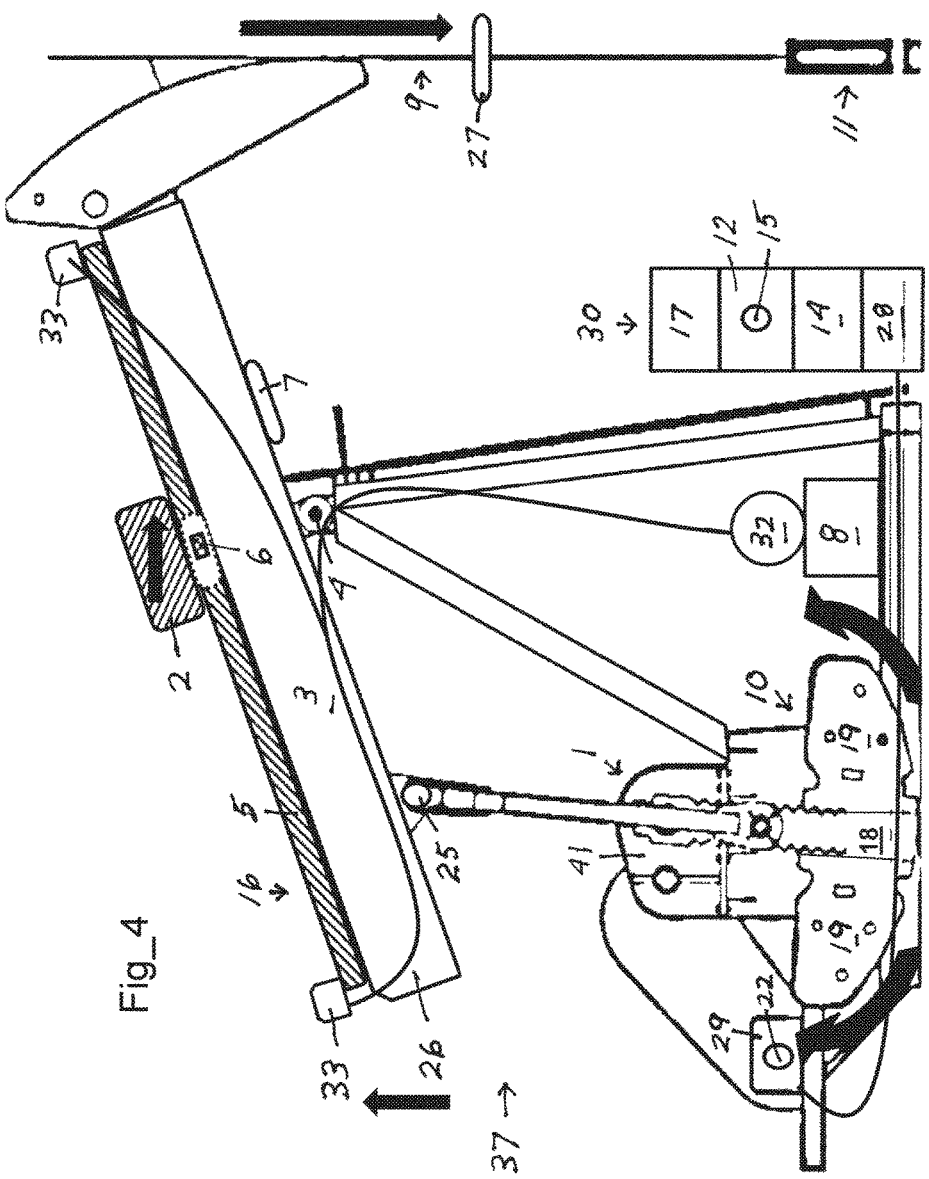
Fig_4

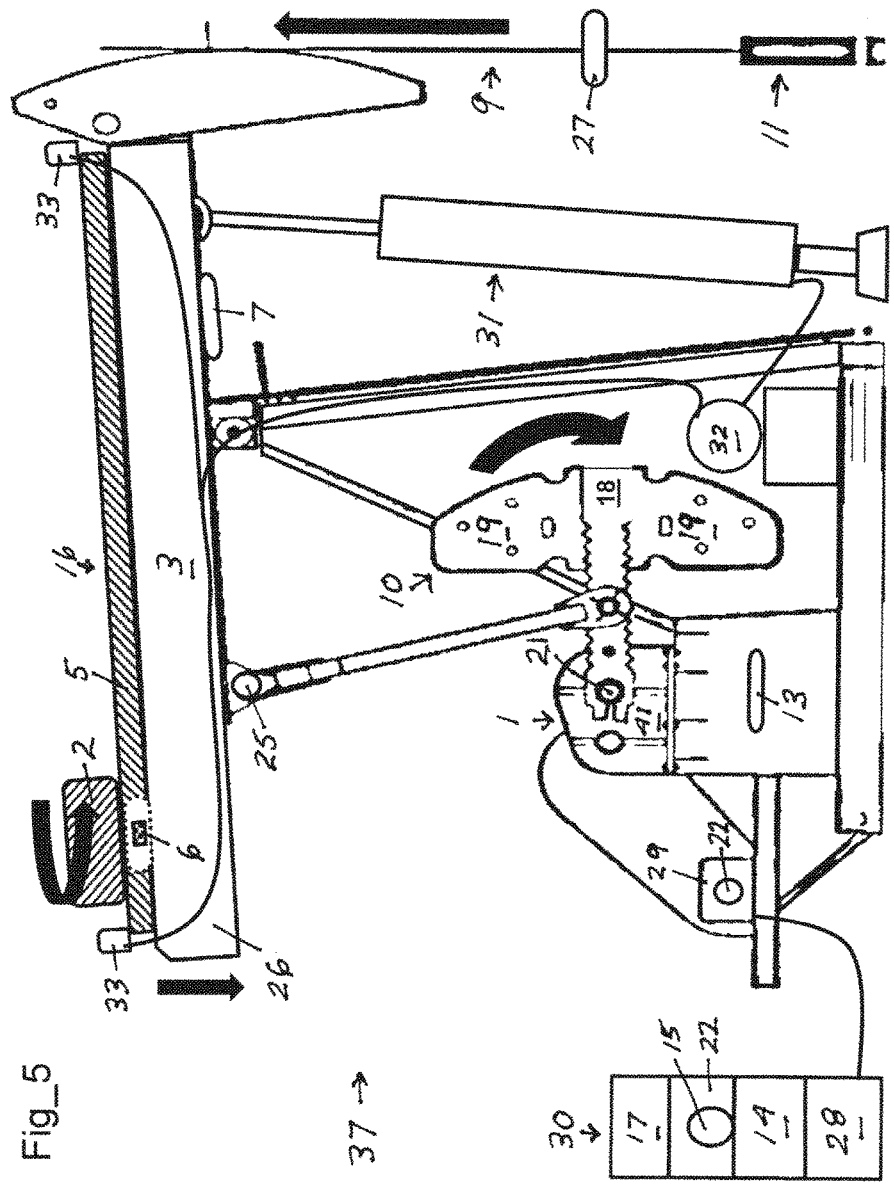
Fig_5

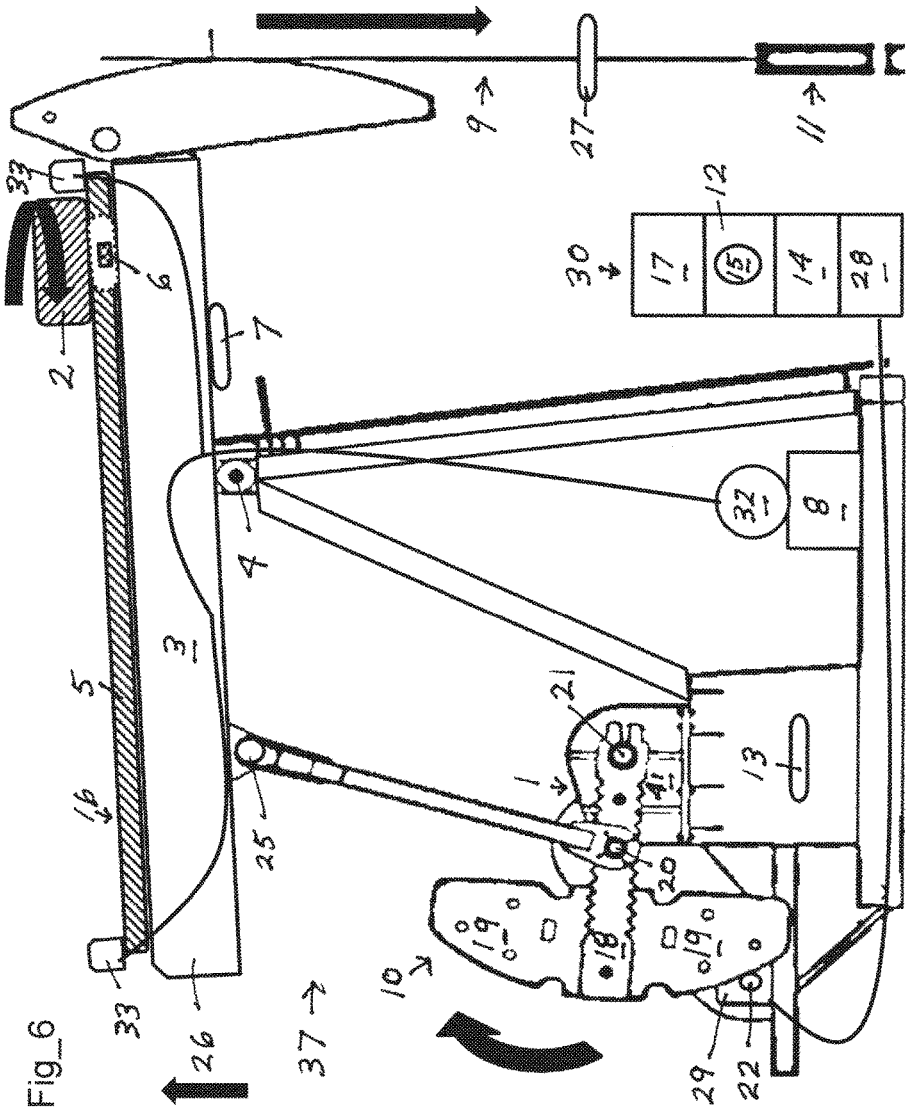
Fig_6

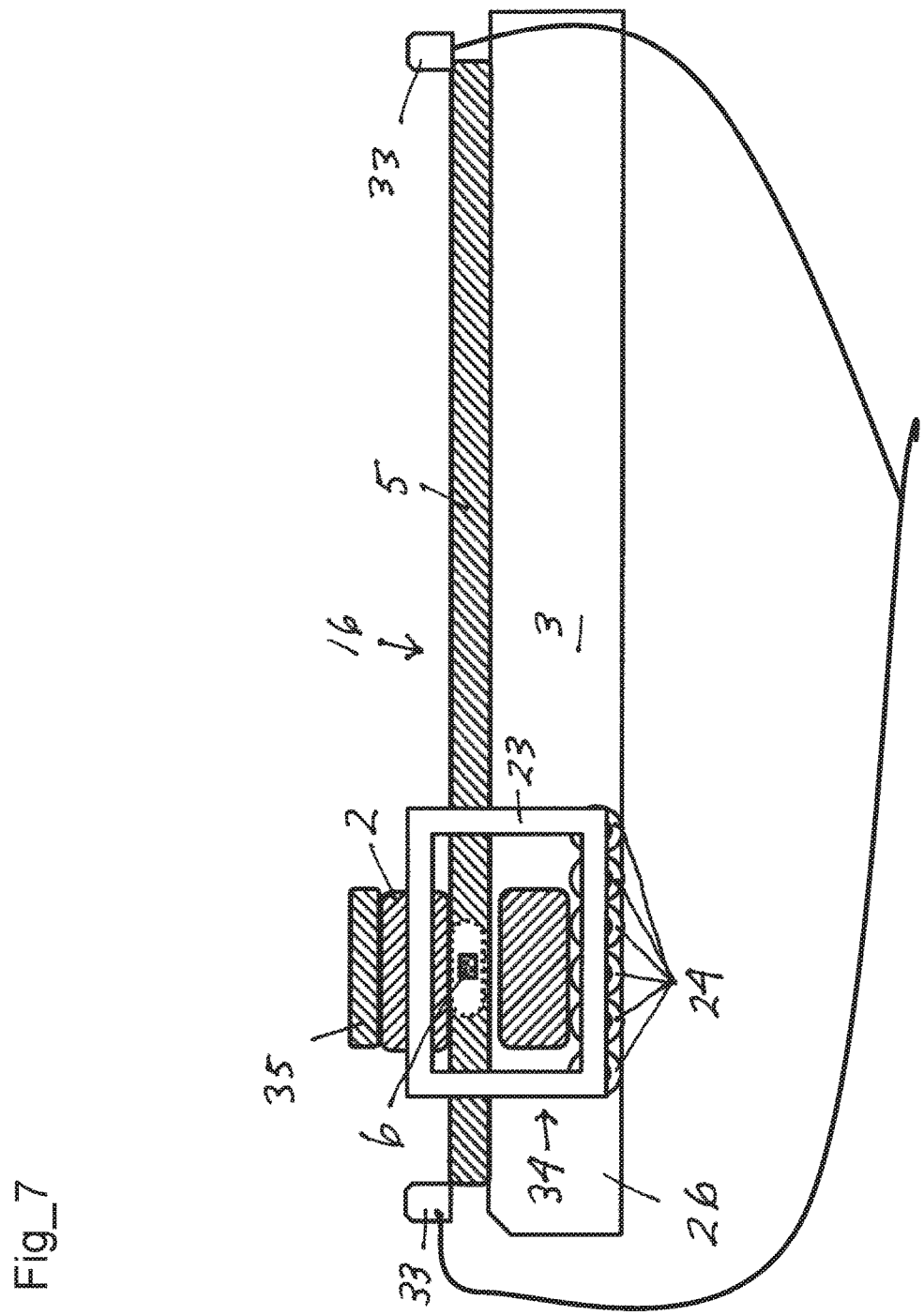

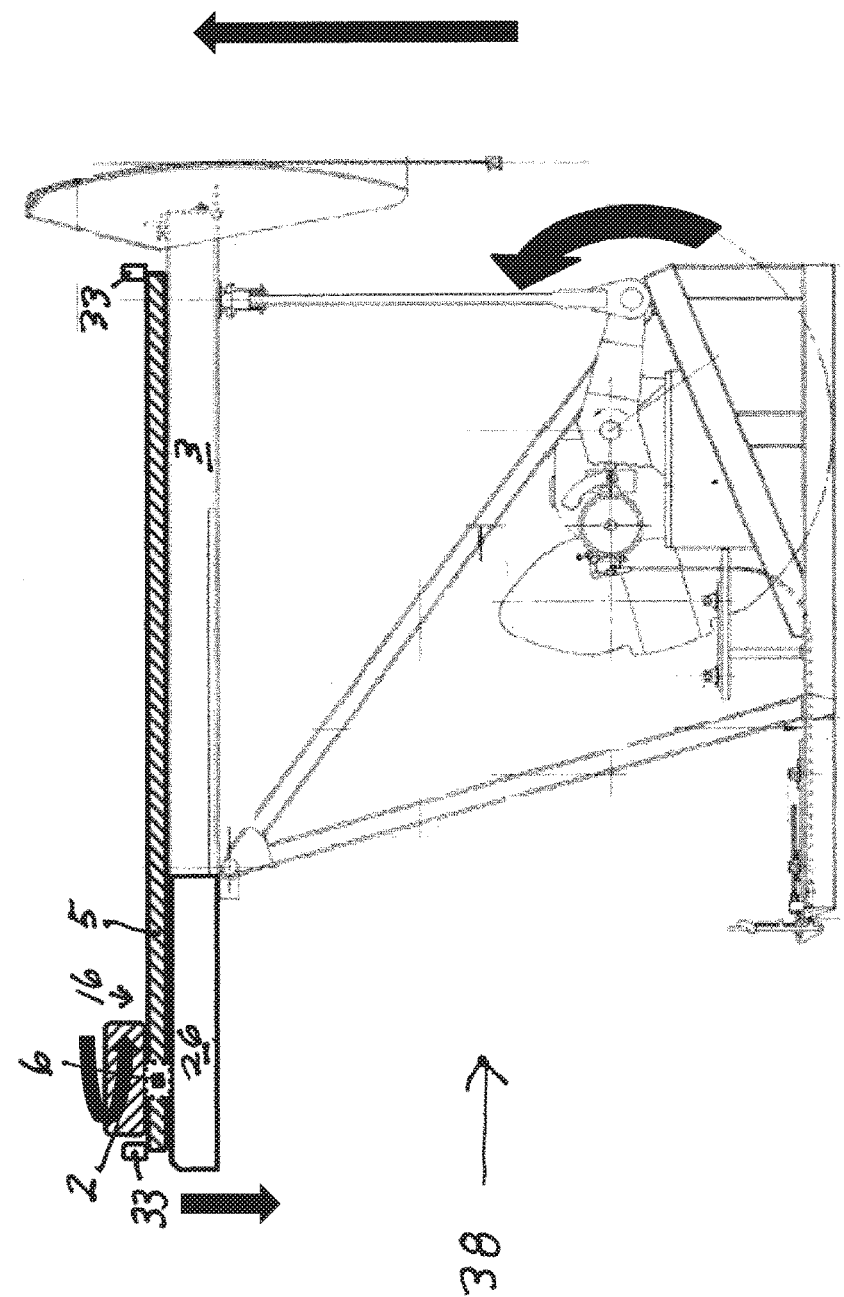

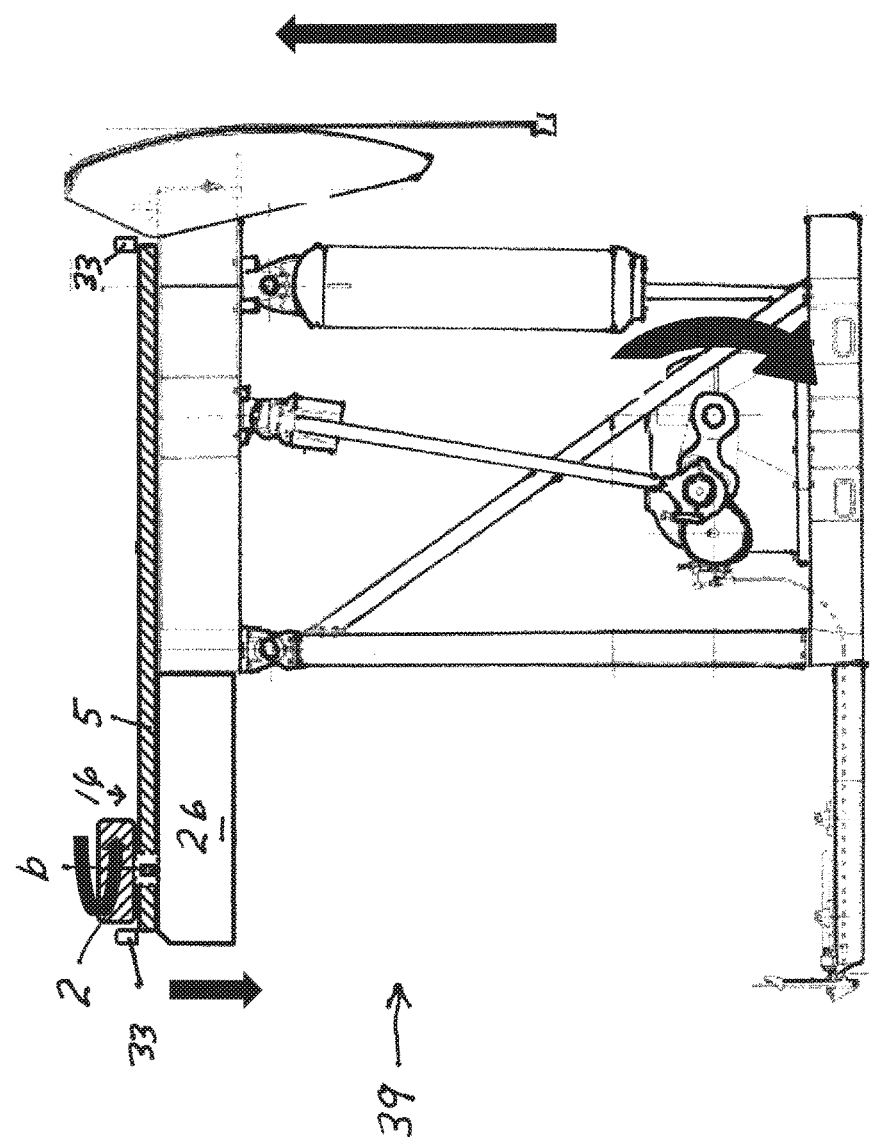

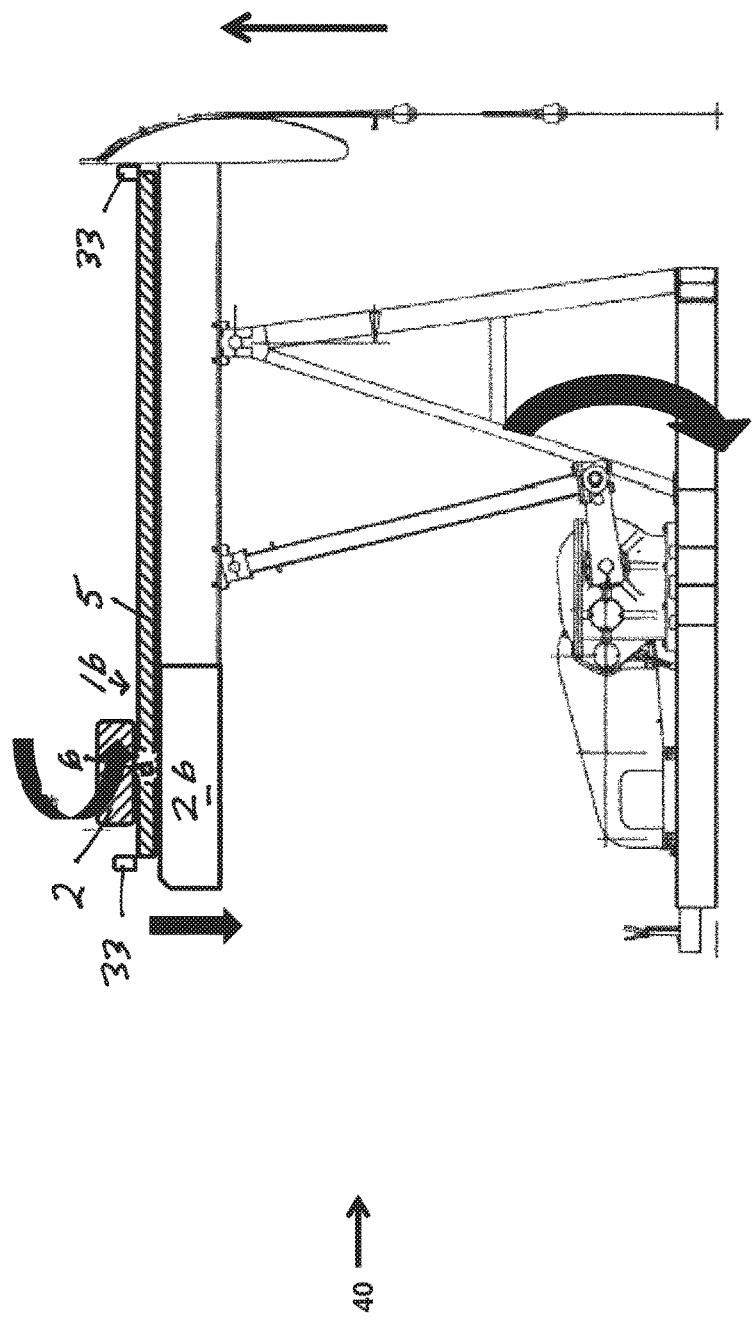
Fig_10

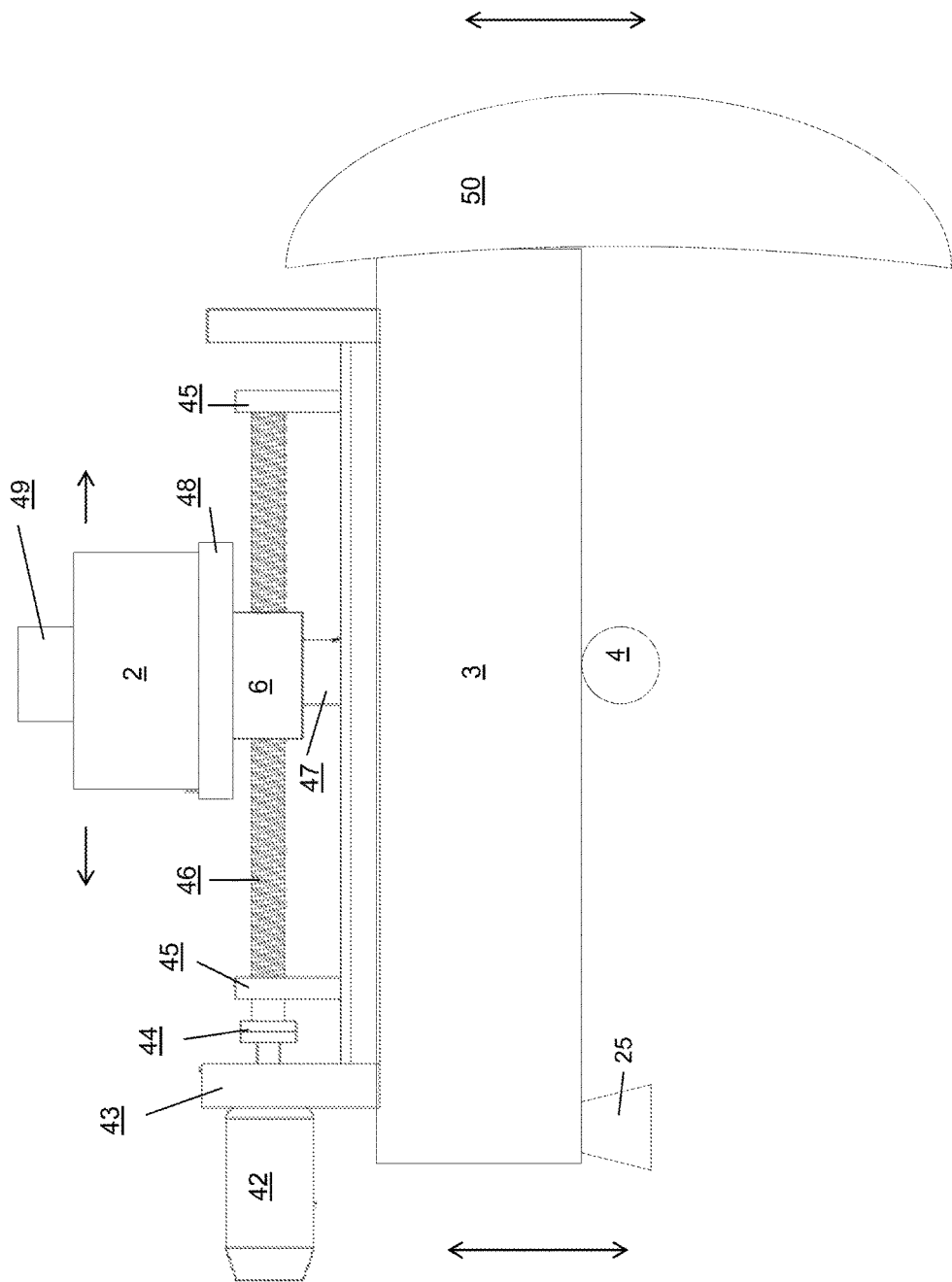

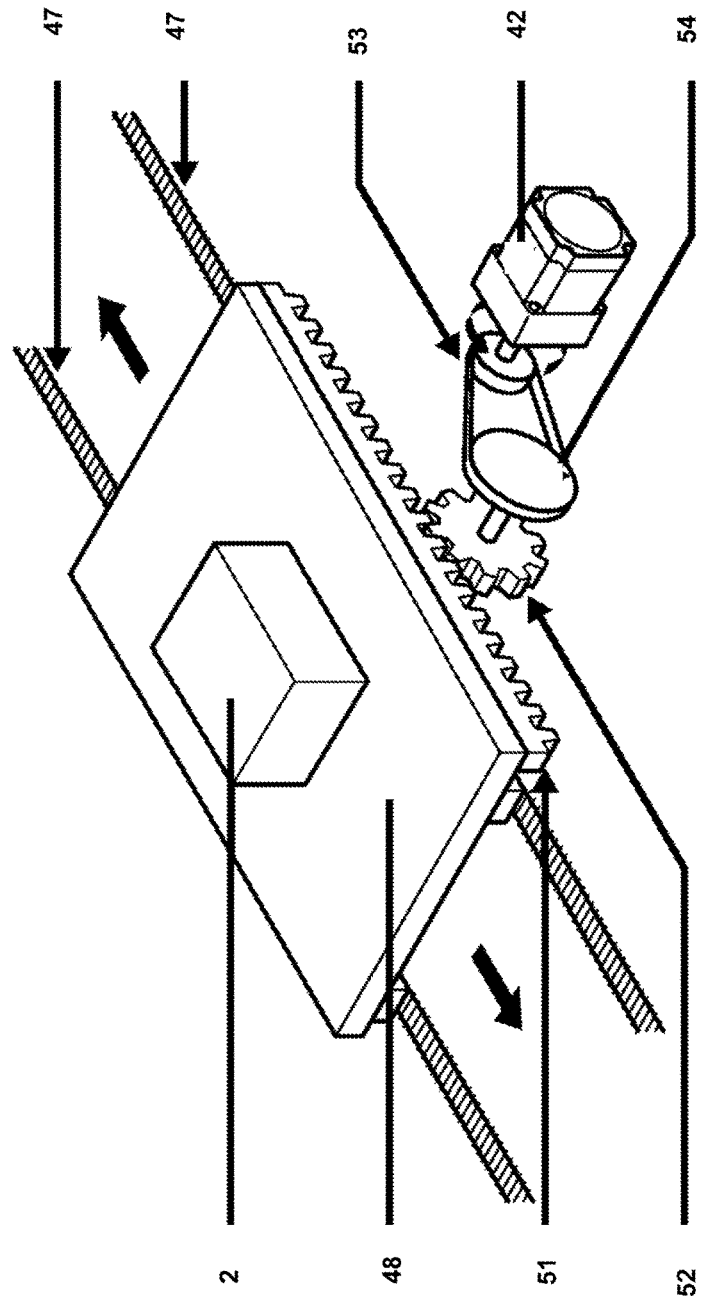

INTELLIGENT FORCE REDUCING DOUBLE-ACTING COUNTERWEIGHT

CROSS-REFERENCE TO RELATED APPLICATIONS

This application claims priority to and the benefit of the filing of U.S. Provisional Patent Application No. 62/403,165, entitled "INTELLIGENT FORCE REDUCING SLIDING DOUBLE-ACTING COUNTERWEIGHT", filed on Oct. 2, 2016; U.S. Provisional Patent Application No. 62/411,556, filed on Oct. 22, 2016; U.S. Provisional Patent Application No. 62/421,410, filed on Nov. 14, 2016; U.S. Provisional Patent Application Ser. No. 62/426,337, filed on Nov. 25, 2016; and U.S. Provisional Patent Application Ser. No. 62/535,945, filed on Jul. 23, 2017 and the specifications and claims (if any) thereof are incorporated herein by reference.

BACKGROUND OF THE INVENTION

Field of the Invention (Technical Field)

Embodiments of the present invention relate generally to improved efficiency for lifting and lowering loads.

Description of Related Art

Lifting and lowering of loads has often been facilitated with the use of counterweight (counterbalance) to offset the load, in a manner to reduce the required force to raise and lower the load with the counterweight to be in some state of balance. Whether as in the intentionally unbalanced state, for example, in the Trebuchet beam, a fulcrum machine where a counterweight heavier than the load causes a beam with a fulcrum point to hurl a missile projectile from the opposite lighter beam end when the much heavier counterweight end drops; or in intentionally balanced modes, for example, an elevator, or a beam well pumping unit, often referred to as a "pump jack", the term "net force" or other synonyms can be used to describe a quantity of positive or negative force required to raise or lower a load after factoring in an attempt to balance or unbalance with counterweight in order to lighten or increase the load. "Gross force" and other synonyms can be used to describe a quantity of force required to raise or lower a load without or before an attempt to balance or unbalance with a counterweight—for example, a weight lifting exercise machine whose very purpose is to be heavy.

Gravity is the natural force being countered with the machine's counterbalance force, so with a fixed amount of load and fixed amount of counterweight the machine's required force is relatively constant. Some designs have attempted to improve lifting efficiency in various ways: by varying the angles of pull in the pulling machine, varying the length of linkages in the pulling machine, varying the size of pulleys in the pulling machine, and/or varying the speed reduction of pull in the pulling machine. In the case of beam pumping units which raise and lower a more or less vertical load there is a tipping (fulcrum) point and counterweight effort and load is intended to be in a close state of balance.

Machines designed to do heavy lifting are big and expensive and repairs on worn parts are expensive. The less force that is needed to accomplish the desired work, the smaller the machine components can be, and the less energy can be consumed accomplishing the work, and the less wear and tear on the machine occurs, and all this results in less expense to operate the machine, so designers have tried force-reducing designs in order to improve the economics of the lifting work.

Now we describe some design attempts to reduce the required lifting forces that are variations of both adjustable crank weight and beam weight "conventional" center tipping (fulcrum point) class 1 lever geometry and class 3 lever geometry (rear tipping point) that have attempted to reduce required counterweight in beam well pumping which in operation converts rotary motion of the prime mover, speed reducer, and crank arms, to vertical reciprocating motion of the pitman arms connected to the beam in order to facilitate rod pumping. Besides conventional class 1 geometry these variations can be front-mounted with rear fulcrum points as a class 3 lever, as in the first 1920s air balance units which still use air cylinder pressure as counterweight, and Parkersburg's "Monkey Motion" with fourteen bearing points which was entirely beam weighted with no crank arm weights which made the larger size beam weights bulky. However, both these designs allow more constant effective counterbalance than crank weighted with rotary motion counterweights as used in the 1930s "grasshopper" (Mark II) with class 3 rear fulcrum.

Deeper wells required more counterweight so massive units came of age in the early 1970s when the first sales order for the Mark II 1280 for Union Oil well in Farnsworth, Tex., was obtained by E. L. Hudson which started the era of massive crank weight pumping units when the Mark II's inventor Walter Trout instructed his engineer Joe Byrd to further refine the grasshopper design to accept the largest phased crank counterweight unit ever, and so came the first Mark II 1280.

The problem is that in beam pumped wells the lifted weight is about 1.5 times the weight of the lowered weight due to lifting the weight of the fluid plus the buoyant weight of the sucker rods in the pipe when lifting, but the fluid weight is then held by the downhole pump standing valve when lowered making lifting and lowering unbalanced, so in known references, the difference in counterweight required is split on the up stroke and down stroke which leaves significant unresolved net torque due to the unsolved unbalanced downhole condition.

With conventional beam units, massive effective counterweight is achieved with leverage of adjustable crank weight. But purely beam weighted units were built by Parkersburg and Cabot and others because the effective beam weight is direct and is more constant than rotary crank weight.

An early phased crank conventional beam unit with class 1 lever fulcrum point (center tipping point/center/bearing, saddle bearing) utilizes the George Eyler (Cabot Corporation) 1963 phased-crank and the Bob Gault (Bethlehem) 1965 drop down tail-advanced geometry. These design elements mainly improve torque factor, which is a crank angle based multiplier from unit geometry that affects torque calculation at the speed reducer, and sometimes is able to reduce torque over "conventional" designs.

The phased crank geometry requires operating the unit in one direction only, which eliminates the possibility to reverse the unit's direction. This is desirable so as to achieve even wear over time on both sides of the gear tooth in the speed-reducer. But, the air balance design can reverse direction and the gear teeth in the speed reducer are known for long life. This is because with easily adjusted air pressure, the counterweight balance is easily maintained to be very close to optimum counterbalance while both lifting and lowering the load.

The Curtis Mitchell (American Mfg.) 1958 motorized screw adjustable beam mounted counterweight used motor amp readings to adjust to the desired position on the rear of the beam to "balance" the unit but reportedly the inevitable damage to threads on the screw caused problems. A more recent design uses a weight mounted on a drop-down lever extending at the rear of the beam that is intelligently moved up and down with a motorized screw in real time based on amp readings and claims ability to achieve fine tune counterbalance within 10% of the desired amount. Another recent geometric variation uses a radically dropped lower down end of beam weight.

In 1984, Sam Gibbs introduced a wave equation that allowed well controllers to shut off pumping units when fluid in the well bore was low. Thus, variable frequency drives were introduced to seek better efficiency by slowing the pumping units or shutting them off when fluid in the well bore was low.

All the designs mentioned can achieve a fairly limited increase in efficiency but still leave the problem of downhole unbalanced weight between lifting and lowering. So, there's much room for improvement—including the need for much greater efficiency regarding reduction of torque and net torque, in order to achieve longer lasting components, and reduced operating expense, reduced power consumption, longer stroke lengths and smaller speed reducers.

BRIEF SUMMARY OF EMBODIMENTS OF THE PRESENT INVENTION

Embodiments of the present invention relate to the continuous movement in some manner of a sliding, rolling or otherwise translating counterweight on a beam to position at or near a moment when lifting or lowering a load with a beam with a fulcrum (tipping point). The resulting lifting force can be positive, zero, or negative.

In one embodiment, the lifting and lowering of the load by a downhole pumping unit can be accomplished via the reciprocating motion of a beam tipping on a fulcrum facilitated with a counterweight that can traverse between the ends of the beam—most preferably by the counterweight traversing the entire length of the beam or as much of the entire length of the beam as is reasonably practicable.

One method to determine the desired position of the sliding weight at a particular moment uses an ammeter's prime mover amperage readings. Another method can be using an inclinometer mounted on the beam to measure beam angle, or magnets and transducers on the speed reducer structure to give crank arm angle, and feeding the measurements to a programmable logic controller. A variable frequency drive can be used to control the speed of the beam to coordinate with the speed of the counterweight.

In one embodiment, when maximum counterweight effect for lifting the load, which occurs at the same time as lowering the crank weight load, is desired, the counterweight will be at the opposite end of the beam from the load end and be positioned at the crank load end. Vice-versa, when maximum load effect for lifting the crank load (e.g. lower the load) is desired the sliding counterweight will be at the opposite end of the beam from the crank weight end and be positioned at the load end.

Using the logic controlled variable frequency drive to control the counterweight position allows for the possibility of continuous minimum force values near zero, with a properly-sized counterweight. Greatly reduced net torque will allow smaller speed reducers and longer reciprocating vertical stroke length and both are economic and performance benefits and include reduced tubing and rod wear.

An embodiment of the present invention relates to a torque-reducing effort assistive counterbalance apparatus for a lever of a pump jack having a movable counterweight; the counterweight configured to translate a beam of the pump jack; a counterweight positioning drive, the counterweight positioning drive communicably couplable to the beam of the pump jack; wherein the movable counterweight is communicably coupled to the counterweight positioning drive such that the counterweight positioning drive can exert a motive force on the movable counterweight and thus cause the movable counterweight to translate along substantially the entire length of the beam of the pump jack; a sensor positioned to directly measure and/or infer net torque exerted by a prime mover; and control logic, the control logic capable of determining where the movable counterweight should be positioned to reduce at least one of the power required of a prime mover and the amount of net gear torque in in the speed reducer. Negative net torque caused by deliberate unbalance is electrically regenerative and some negative unbalance may occur when reducing net torque. In one embodiment, the control logic can be configured such that it is capable of determining where the movable counterweight should be positioned continuously during a pumping cycle to reduce at least one of the power required of a prime mover and the amount of net gear torque in in the speed reducer. The control logic can be configured such that it is capable of determining where the movable counterweight should be positioned at least two times during each pumping cycle. The counterweight positioning drive can include be pneumatically-powered counterweight positioning drive, which itself can optionally include a rodless piston. In one embodiment, the rodless piston can be a double-acting rodless piston. The sensor can be configured to sense power requirement of the prime mover.

In one embodiment, the control logic can be configured to cause the movable counterweight to be moved by the counterweight positioning drive to exert a downward force on a rear-portion of the beam, aft of a fulcrum of the beam, during an upstroke of the pump jack—the rear-portion of the beam being an opposite end-portion of the beam from a head of the pump jack. The control logic can also preferably be configured to cause the movable counterweight to be moved by the counterweight positioning drive to exert a downward force on a front-portion of the beam during a down-stroke of the pump jack—the front-portion of the beam being forward of a fulcrum of the beam, the movable counterweight thus residing on the same end-portion of the beam as a donkey-head of the pump jack.

An embodiment of the present invention also relates to a torque-reducing effort assistive counterbalance method for reducing the net torque required to drive an unbalanced down hole lever-type pump jack, the method including determining a weight imbalance of the pump jack, having a load connected thereto, with a sensor; positioning a movable counterweight to exert a downward force on a beam of the pump jack to offset the determined weight imbalance; and repositioning the movable counterweight at least once during a single pumping cycle, wherein repositioning the movable counterweight comprises moving the movable counterweight from one side of a fulcrum point of a beam an opposing side of a fulcrum point of the beam. Determining a weight imbalance of the pump jack, having a load connected thereto, with a sensor can include determining at least one of the power required of a prime mover and the amount of net gear torque in in the speed reducer. to operate the pump jack, having a load connected thereto. Optionally, repositioning the movable counterweight can include actuating a counterweight positioning drive.

In one embodiment, actuating a counterweight positioning drive can include actuating a double-acting rodless piston. Optionally, determining a weight imbalance of a pump jack, having a load connected thereto, with a sensor can include determining a weight imbalance of the pump jack with a load connected thereto with a sensor at least twice during a single pumping cycle, and/or at least 12 times during a single pumping cycle. Determining a weight imbalance of a pump jack, having a load connected thereto, with a sensor and positioning a movable counterweight can both be accomplished, at least partly, via a programmable logic controller. Determining a weight imbalance of the pump jack, having a load connected thereto, with a sensor can include one or more of using a load cell and measuring a current of an electric motor.

An embodiment of the present invention also relates to a torque-reducing effort assistive apparatus for a lever having a movable counterweight, the movable counterweight communicably coupled to the lever and configured to translate along a length of the lever; a counterweight positioning drive mechanically coupled to the movable counterweight, wherein the counterweight positioning drive can be configured to position the movable counterweight along the length of the lever; and a position selection apparatus in communication with the positioning drive to select a position of the movable counterweight, the position selection apparatus configured to automatically initiate adjustment of the movable counterweight at least twice during a single up and down reciprocation of the lever. Optionally, the position selection apparatus can include a programmable logic controller. The counterweight positioning drive can include a double-acting rodless piston, magnetic field propulsion, electro magnetism, electric or magnetic drive.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 1 is a front view of a counterweight assembly according to an embodiment of the present invention wherein the counterweight is positioned at the front of the beam with the crank rotation counter-clockwise (CCW) at crank angle 90 degrees moving the load down;

FIG. 2 is a front view of a counterweight assembly according to an embodiment of the present invention wherein the counterweight is positioned at a middle of the beam with the crank rotation in either direction at crank angle 0 degrees and entering this angle with the load moving downwards and leaving this angle with the load movement upwards;

FIG. 3 is a front view of a counterweight assembly according to an embodiment of the present invention wherein the counterweight is positioned at the back of the beam with the crank rotation CCW at crank angle 270 degrees moving the load up;

FIG. 4 is a front view of a counterweight assembly according to an embodiment of the present invention wherein the counterweight is positioned at the middle of the beam with the crank rotation in either direction at crank angle 180 degrees and entering this angle with the load moving upwards and leaving this angle with the load movement downwards;

FIG. 5 is a front view of a counterweight assembly according to an embodiment of the present invention wherein the counterweight is positioned at the front of the beam with the crank rotation clockwise (CW) at crank angle 90 degrees moving the load up;

FIG. 6 is a front view of a counterweight assembly according to an embodiment of the present invention wherein the counterweight is positioned at the back of the beam with the crank rotation CW at crank angle 270 degrees moving the load down;

FIG. 7 is a front view of an auxiliary counterweight assembly that can increase dead weight when increased effective counterweight is desirable according to an embodiment of the present invention;

FIGS. 8 and 9 are drawings which illustrate an auxiliary counterweight assembly attached to or otherwise incorporated into different forms of class 3 levers according to an embodiment of the present invention; and FIG. 10 is a drawing which illustrates a counterweight assembly on a pump jack having no crank weights according to an embodiment of the present invention.

FIG. 11 is a front view of a counterweight assembly according to an embodiment of the present invention wherein the drive positioning assembly is a lead screw.

FIG. 12 is a front view of a counterweight assembly according to an embodiment of the present invention wherein the drive positioning assembly is a rack and pinion.

DETAILED DESCRIPTION OF THE INVENTION

The term "sliding" when referring to a counterweight, is used for the sake of simplicity and is not intended to limit the ability to move the counterweight only by dragging or skidding the counterweight, instead, the term "sliding" when used in the context of moving the counterweight is intended to include any and all manners of moving a counterweight across one or more surfaces, including but not limited to moving the counterweight via dragging or skidding it, rolling it with bearings, wheels, or rollers, interfacing toothed structures, such as racks and pinions, magnetic field propulsion, electro magnetism, electric or magnetic drive, combinations thereof, and the like. The term "programmable logic controller" is intended to include not only programmable logic controllers in the traditional sense, but is also intended to include microcontrollers, microprocessors, combinations thereof and any other circuit capable of carrying out one or more aspects of the present invention. The term "system controller" is intended to include one or more programmable logic controllers, microcontrollers, microprocessors, combinations thereof and any other circuit capable of carrying out one or more aspects of the present invention. As used throughout this application, the term "net torque" is intended to mean at least one of 1) the amount of net torque that prime mover 29 must exert to effect a desired result on a load; and 2) the amount of net gear torque in in the speed reducer. The term "pump jack" is intended to include reciprocating walking beam pumping units and beam pumping units. When referring to a pump jack, the term "substantially the entire length of the beam" is intended to mean at least 60% of the entire length of the beam and more preferably at least 75% of the entire length of the beam, and most preferably at least 90% of the entire length of the beam. For embodiments wherein the beam is a class 1 lever, the term "substantially the entire length of the beam" is intended to include traversing both sides of a fulcrum thereof. As used throughout this application, the term "pumping cycle" is intended to mean an individual up and down stroke of a pump jack.

In accordance with embodiments of the invention, the best mode is presented in terms of the described embodiments, herein depicted within FIGS. 1 through 10. However, the disclosure is not limited to the described embodiments and, upon studying the instant application, a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Embodiments of the present invention can be used in conjunction with class 1, class 2, and class 3 levers.

FIG. 1 illustrates an embodiment wherein well 11 is pumped by beam 3, which lifts load 9, which in this particular example is about 1.5 times greater than that of load 9 when it is in its lowered position. This is due to lifting the weight of the fluid plus the buoyant weight of the sucker rods in the pipe when lifting up, but that weight is then held by the well tubing in the downhole pump standing valve when being lowered. Thus, in known systems, the difference in load 9 is more or less split on the up stroke and down stroke which leaves a state of significant net torque 1 on prime mover 29 and net gear torque in in the speed reducer 41, due to the remaining unsolved unbalanced condition. Embodiments of the present invention solve the problem of these high net torque 1 needed to lift and lower load 9 and crank weight 19 at effort point 25 with counterweight 2 whose position on beam 3 reduces lifting and lowering net torque 1. Negative net torque 1 caused by deliberate unbalance is electrically regenerative and some negative unbalance may occur when reducing net torque 1. In one embodiment, prime mover 29 can include but is not limited to an electric motor, an internal combustion engine, a hydraulic motor, combinations thereof and the like. Most preferably, counterweight 2 is movable so that it forms an intelligent force-reducing adjustable double-acting counterweight. In this embodiment, counterweight 2 intelligently changes position on beam 3 to be positioned wherever it can best cause the most reduction in net torque 1 that is required to lift and lower load 9 and/or crank weight load 10 at effort point 25. In this embodiment, FIG. 1 illustrates a class 1 lever having beam 3 that pumps with adjustable crank weights 19 and counterweight 2 is preferably positioned on the opposite end of beam 3 from crank weight 19 when lowering load 9.

FIG. 2 illustrates that of the many applications that embodiments of the present invention can apply to, we now consider an embodiment of the present invention as applied to class 1 lever—for example conventional crank weight pumping unit 37 and class 3 levers 38 and 39 (see FIGS. 8 and 9) as applied to a reciprocating beam pump, where circular motion is transferred from prime mover 29 to speed reducer 41 and then converted to linear motion with a pitman that is connected from crank pin 20 to effort point 25 of beam 3 and net torque 1 is reduced by positioning counterweight 2. Beam weighted units 40 (see FIG. 10) in this description will be addressed separately as a cousin to conventional crank weight pumping unit 37 or air balance units 39.

FIG. 3 illustrates a class 1 lever having beam 3 that pumps with adjustable crank weights 19 and counterweight 2 is on the opposite end of beam 3 from load 9 when lifting load 9. For example, when positioned as illustrated in FIG. 3, counterweight 2 is preferably disposed to the left of fulcrum 4 on an upstroke, but in FIG. 1 is moved to the right of fulcrum 4 on a down-stroke.

FIG. 4 illustrates an embodiment that when crank arms 18 are straight down at 180 degrees, which is the position of low torque factor, and counterweight 2 is neutrally positioned near the middle of beam 3 above fulcrum 4 and wherein front end (i.e. the end nearest well 11) of beam 3 is as high as it will go at or about 180 degrees crank angle and is about to re-start the cycle of reciprocating downward. At that moment, counterweight 2 begins sliding away from neutral fulcrum 4 near the middle of beam 3, toward the front end of beam 3 (i.e. well 11 end of beam 3) and is timed to arrive at the front end when crank arm 18 reaches near horizontal at either 90 degrees or 270 degrees to achieve maximum effective counterweight to offset the high torque factor in helping to lift crank weight 19 upwards. Then, crank arms 18 continue rotating upward and counterweight 2 starts moving back to neutral near the middle of beam 3, where it is preferably timed to arrive in neutral above fulcrum 4 when crank arms 18 are straight up at or 0 degrees.

One method to calculate timing with position selection apparatus comprised of at least one of a vector logic circuit and a counterweight position circuit is:

Distance from fulcrum to front counterweight position/seconds elapse between 90 degree crank positions=feet per second (fps) counterweight speed Distance from fulcrum to rear counterweight position/seconds elapse between 90 degree crank positions=feet per second counterweight travel speed Example: 10'/2 seconds=5 feet per second (fps) counterweight travel speed FIG. 5 illustrates that continuing the cycle when crank arms 18 are straight up at 0 degrees, which is the position of low torque factor, counterweight 2 is preferably neutrally positioned near fulcrum 4 and the rear end or effort point 25 end of beam 3 is as high as it will go and so will re-start the cycle of reciprocating downward. At that moment, counterweight 2 preferably begins moving away from neutral near fulcrum 4 of beam 3 and begins moving toward rear effort point 25 end of beam 3 and is preferably timed to arrive at rear effort point 25 end when crank arm 18 reaches near horizontal either 90 degrees or 270 degrees to achieve maximum counterbalance effect to offset high torque factor in helping to lift load 9 upwards. Then, crank arms 18 continue rotating upward and sliding counterweight 2 starts sliding back to neutral, near fulcrum 4, where it is timed to arrive when the crank arms are straight down at 180 degrees.

Embodiments of the sliding counterweight drive mechanism can include, but are not limited to two opposing single acting rodless cylinders, tandem double-acting pneumatic cylinders for extended length; double-acting hydraulic cylinder with a hydraulic pump and return reservoir; motorized lead screw bolt, ball screw, or rack and pinion gear drives; magnetic field propulsion; electro magnetism; an electric motor, a reciprocating electric motor; linear motor or servo motor with encoder; cable pullers, chain pullers, and/or belt pullers, with a series of pulleys configured to actuate with beam 3; and other mechanical means consisting of gears, cables, chains, belts, and electric or magnetic drive.

In one embodiment the movement of counterweight 2 is preferably caused by a double-acting pneumatic rodless cylinder of a positioning drive 16. Sensors on positioning drive 16 can be magnetic to achieve spot positioning as cylinder passes or transducer type sensors for more continuous positioning signals. Air valves 33 with nomenclature, for example a 4/2 and 5/2 on positioning drive 16 open and close as calculated and are instructed to actuate a cylinder of positioning drive 16 to move counterweight 2 into position on beam 3 as computed by programmable logic controller 14. For example, the moment the rodless pneumatic piston passes by a magnetic sensor on the rodless piston carriage 5 a signal indicating that spot position can be sent to the programmable logic controller. Or reaching the end of the beam can sensed and it can then have a programmed delay before being instructed to return. Or adding transducers on the rodless piston carriage 5 can detect and measure variations in current and/or voltage which can be converted to signals that indicate the real time rodless pneumatic piston position and speed in the carriage 5. Also speed control muffler, quick exhaust valves, needle valve and flow control fittings can control pneumatic speed. And potentiometer, hall effect sensor, motor controller, lead switch, and limit switch can be used for linear actuator and servo motor position control.

Counterweight 2 movement can be controlled by using basic reversal controls coordinated with beam position. In one embodiment, an apparatus and/or system to monitor movement and achieve position control of counterweight 2 moving from at or near one or both ends of beam 3 can be accomplished by obtaining readings of power use by prime mover 29 by ammeter 17 sent to programmed logic controller 14 to send signals to valves 33 on a rodless cylinder of positioning drive 16 to which counterweight 2 is connected, for positioning counterweight 2 to maintain ammeter 17 reading nearest to a low amperage reading throughout the complete reciprocating cycle.

In a redundant configuration, an optimum position of counterweight 2 on beam 3 to achieve a reduction in net torque 1 can be computed by programmed logic controller 14 interpreting input data which can include from load cell 27 communicably coupled to load 9, an inclinometer 7 sensing angle of beam 3, transducers 22 and magnets on prime mover 29, sensor 13 on the pumping unit structure sensing crank angle and strokes per minute, and/or signals from magnets or transducers on positioning drive 16. The signals from one or more sensors and load cell 27 are preferably interpreted by programmed logic in controller 14 to compute optimum lowest value of at least one of the power required of a prime mover and the amount of net gear torque in in the speed reducer 41 by positioning counterweight 2, most preferably based on information from measurements, which can include, but is not limited to calculations using wave equation and inserted into a machine learning algorithm program.

One embodiment of the present invention uses programmable logic controller 14 that processes the previously described measurements and provides them to a sending unit so that the machine learning algorithm communicates instructions to the drive mechanism to control the position of counterweight 2 continuously. In this embodiment, programmable logic controller 14 can, for example, be programmed with the machine learning algorithm such that it will continually process new readings, parameters, and measurements and continually, in real time or near real time, send positioning instructions to positioning drive 16 to position counterweight 2 in order to reduce at least one of the power required of a prime mover and the amount of net gear torque 1 in in the speed reducer 41. These measurements can be based on the reduced effective amount of load 9 and effective crank weight load at effort point 25. In one embodiment, a series of downhole measurements, including but not limited to those from load cell 27 on well 11, can be input into programmable logic controller 14. Another input can optionally include a position of crank arm 18, which can optionally be obtained, at least in part, based on measurements from sensors 13, which can include magnetic transducers, on the pumping unit structure. Other inputs can optionally include the position of beam 3 based on inclinometer 7, which is preferably disposed on beam 3; ampere measurements from ammeter 17, for embodiments wherein prime mover 29 comprises an electric motor; from vacuum readings for embodiments wherein prime mover 29 comprises an internal combustion engine; and/or one or more measurements stored in memory module 12 for programmable logic controller 14. In one embodiment, display 15 is preferably provided and can be operatively connected to memory module 12 and/or programmable logic controller 14 for displaying a series of measurements stored in memory module 12 for logic controller 14, and/or for displaying indicia of one or more values from any other sensor or combinations of sensors used.

In one embodiment, machine learning algorithm can be processed using system controller 30. System controller 30 preferably sends positioning instructions to positioning drive 16—most preferably in real time or near real time. Processed instructions to positioning drive 16 selectively positions counterweight 2 so that the position of counterweight 2 causes reduced net torque 1 as the result of reduced effective load 9 and then also reduced effective crank weight load 10 at effort point 25. System controller 30 preferably includes a programmable logic controller 14 that is most preferably programmed with a machine learning algorithm and allows the continuous processing of new readings, parameters, and measurements. System controller 30 also preferably includes a sending unit that communicates the processed data to a positioning selection mechanism that is preferably communicably coupled to positioning drive 16, which positions counterweight 2 in accordance with the instructions.

In one embodiment, the machine learning algorithm can be processed by system controller 30 with an input for a series of downhole measurements. These inputs can include but are not limited to inputs from load cell 27 on well 11; crank arm 18 position measurements—for example from magnets with sensors 13 mounted on the pumping unit structure; position of beam 3 from inclinometer 7; ampere measurements from ammeter 17, for embodiments wherein prime mover 29 is an electric motor, and/or vacuum readings for embodiments wherein prime mover 29 is an internal combustion engine.

In one embodiment, the machine learning algorithm can be processed by a measurement input that can store a series of measurements in memory module 12 for programmable logic controller 14.

In one embodiment, system controller 30 can process the series of measurements stored in memory module 12 for logic controller 14 with a machine learning algorithm such that display 15 is operatively connected to the system controller with memory module 12 and programmable logic controller 14.

Net torque can be determined, where:
O=crank position (for example from the inclinometer 13),
W=polished rod load (for example via a load cell 27) at any specific crank angle, M=maximum moment of the rotary counterweights (from the manufacturer or computed from measurements),
TF=torque factor for a given crank angle (from the manufacturer's tables or computed from geometric measurements), and
B=structural unbalance (from the manufacturer or measured), With these input values Tn=net torque is computed as Tn=TF (W−B)−M SIN O The rotational motion of crank arms 18 cause a maximum moment of rotary crank weights 19, crank shaft 21 and crank pins 20 about crankshaft 21 in inch-pounds, which is nominally the maximum effective crank counterbalance at about 90 degrees or 270 degrees. And 90 degrees and 270 degrees is nominally the position of maximum torque and effective counterbalance. So when the programmed logic commands the position of counterweight 2 to be at effective crank weight 10 effort point 25 end of beam 3, it is increasing effective crank counterweight 10 to offset the maximum amount of net torque 1 in the horizontal position to raise load 9, and, vice versa when commanded to be at load 9 end of beam 3 to raise the effective crank weight 10 at effort point 25.

The size and weight of counterweight 2 required can be bigger or smaller and thus heavier or lighter depending on the particular well parameters. In one embodiment, additional weights 35 can be added to or subtracted as desired. Optionally additional weights 35 can be slab-type weights and counterweight, or a carriage connected thereto, can comprise a hanger or rack to apply one or more additional weights 35. In addition, in one embodiment, weights 34 can be added, for example, between beam 3 flanges carried by frame 23 with rollers 24, which are most preferably cylindrical rollers.

FIG. 10 illustrates an embodiment wherein the beam weight and counterweight 2 are provided on beam weighted units 40. In this embodiment, counterweight 2 is preferably heavy enough to equal the weight of the rods plus the weight of the fluid, by moving to a selected position between near load 9 to away from load 9 repetitively, can be in and of itself enough weight to cause beam 3 to reciprocate. Counterweight 2 can slide away from load 9 and then past effort point 25 and onto beam extension 26 for additional effective weight. With beam weighted unit 40, position counterweight 2 above effort point 25, and initially position counterweight 2 so the front end of load 9 with effort point 25 load are in equilibrium so the result is that counterweight 2 can cause net torque 1 to be minimal or negative when moved to positions between near load 9 to away from load 9 on extended beam when crank arms 18 are near horizontal at the maximum torque factor.

With conventional crank weight pumping unit 37, and/or class 3 lever 38 (see FIGS. 1-8), in one embodiment, upon initial start up the position of adjustable crank weights 19 will be placed as in the current art normal practice, e.g., conventional crank weight pumping unit 37 is made to be stationary and secured with brake shoes, brake hub dog, and/or chain, and now with counterweight 2 at rest locked in neutral directly above the beam's fulcrum 4 (tipping point, a.k.a. saddle or center bearing). Adjustable crank weights 19 are then disposed on crank arms 18 so that they effectively counterbalance the weight of the sucker rods in fluid plus ½ the weight of the fluid, as is customary in the current art to balance beam 3 pump using standard operating procedure to result in TN (net torque) as low as possible, where ammeter 17 readings are closest to being equal on both the upstroke and the down-stroke of load 9 for embodiments wherein prime mover 29 is an electric motor.

Then, when put in operation in either rotational direction with the following conditions met:
1) counterweight 2 is instructed to be positioned at one end of beam 3, with that end in a downward motion, and
2) crank arms 18 nominally at either a 90 degree crank angle, then the weight on beam 3 end is caused to be greater. This increased weight reduces net torque 1 requirement.

The effective unbalance can thus be programmed to be greater or lesser at the operator's discretion depending on the amount of counterweight effect 10 chosen and the positioning parameters entered into system controller 30 to achieve as close to minimum net torque 1 requirement as possible throughout the pump cycle or negative torque.

Thus, with this balance method, if counterweight position selection mechanism is turned off, for example, when needing repairs or maintenance, conventional crank weight pumping unit 37 can still operate without counterweight 2 by locking it in neutral position above fulcrum 4.

In one embodiment, positioning drive 16 preferably comprises a rodless cylinder, which preferably sits on top of beam 3 and is most preferably almost as long as beam 3 so that counterweight 2 can travel substantially the entire length of beam 3—or as much as is reasonably practical considering the design of beam 3.

Counterweight 2 is preferably disposed on top of positioning drive 16 with a cushion on each end to soften reversals and can optionally be connected to moving frame 34 with a table built in above and coupled to positioning drive 16. In one embodiment, movable component 6 of positioning drive 16 can comprise rodless element/piston, which can be magnetic and thereby securely attract metallic counterweight 2 to follow its movements.

FIG. 11 illustrates an embodiment when movable component 6 of positioning drive 16 can comprise nut of screw 46 rotating with bearings 45 with coupling 44 to an electric motor 42, for instance a servo motor or stepper motor and encoder, held with a mount 43. Counterweight 2 with a position sensor 49 can be connected to a table 48 sandwiched between counterweight 2 and moveable component 6 on slide 47.

FIG. 12 illustrates an embodiment when movable component 6 of positioning drive 16 can comprise rack 51 on guides 47 and pinion 52 with an electric motor 42, for instance a servo or stepper motor and encoder, which can be connected to a table 48 sandwiched between counterweight 2 and rack 51. Electric motor 42 can be a direct gear drive or use belt and motor pulley 53 and pinion pulley 54.

Counterweight 2 can be connected to the table 48 sandwiched between counterweight 2 and moveable component 6 by bolt, rivet, weld, magnetism or other preferably removable fastener.

In one embodiment, frame 23 can encircle a portion of beam 3 and can optionally be part of positioning drive 16, thus allowing counterweight 2 to rest on frame 23 atop and alongside beam 3 between the top and bottom flange of beam 3 to increase counterweight effect 10. In one embodiment, the movement of frame 23 is preferably supported and facilitated by bearings, for instance by cylindrical roller housings enclosing lubricated rollers 24, which are most preferably formed from a hard material such as steel, with good tribological properties.

Counterweight 2 is most preferably formed from a dense material, including but not limited to steel, iron, lead, mercury, concrete, combinations thereof and the like. Steel is good and encased mercury or lead is even more dense. Other heavy and/or dense materials can be used but lesser dense material will have less counterweight effect 10 in the same volume of space.

FIGS. 1-10 illustrate an embodiment wherein beam extension 26 can optionally be provided to the rear of effort point 25 on beam 3. This allows for positioning drive 16 to be longer and counterweight 2 to be positioned on beam extension 26 to have more counterweight effect 10 due to increased leverage. This is useful for conventional crank weight pumping units 37—for example, class 1 lever beam pumps. And, this is especially useful for class 3 levers 38, such as a FIG. 8 Mark II "grasshopper", as well as FIG. 9 air balance units 39 and any other unique geometries where fulcrum 4 is a rear fulcrum 36 (tipping point} of the beam instead of the "conventional" class 2 lever fulcrum 4 position. In addition, beam weight pumping unit 40 without crank weights 19 utilizing only adjustable counterweight 2 on beam 3.

In one embodiment, the position on beam 3 of counterweight 2 is preferably precisely correlated and timed with the strokes per minute of beam 3 pump. Variable frequency drive 28 can slow the upward or downward speed of load 9 in mid stroke when counterweight 2 position causes reduced net torque 1 or negative net torque 1 and increased effective weight thus causes beam 3 pump speed to increase past a desired preset limit. Alternatively, a torque valve can be used as a limiter. Variable frequency drive 28 with programmable logic controller 14, which is preferably programmed for this application, can include a component of the preferred configuration. This is because desired strokes per minute of beam 3 can be controlled in coordination with data from load cell 27 via the chosen speed of prime mover 29. This configuration increases well management and is available when variable frequency drive 28 is integrated with a sensor package. This embodiment can allow a longer pump stroke without increasing torque 1 in the speed reducer 41 and prime mover 29 and can allow a slower pumping speed which is usually operationally desirable.

This adjustable beam counterweight 2 can be installed on already existing pump jacks at existing well installations by attaching positioning drive 16 to existing beam 3, or adapting any other workable method to move counterweight 2. Alternatively, counterweight 2 can be part of original equipment on newly manufactured reciprocal beam pumps. OEM design can optionally have longer beam pump stroke lengths and smaller net torque 1 capacity speed reducers 41 than those prior to this invention. This is because of the increased efficiency with counterweight 2 position effectively reducing the lifting and lowering net torque 1. And, with those longer strokes, the pump jack can operate at slower strokes per minute, reduce tubing and rod wear, and also allow the use of lower horsepower prime mover 29. As such, pumping unit design can be improved with longer stroke lengths and smaller speed reducers 41, to accommodate the benefits of embodiments of this invention.

Air pressure for double-acting rodless cylinder of positioning drive 16 can be supplied by any capable and/or suitable supply with an air hose to reserve tank 32 and an air hose to a valve 33 such as 4/2 or 5/2 valve 33. In one embodiment, compressed air is preferably provided by an air compressor, which can optionally include beam actuated piston air compressor 31 powered by beam 3. In one embodiment, a double-acting single cylinder can be used as beam air compressor 31, and is preferably pivotably connected at its top by a bearing to beam 3 and the lower extremity is preferably pivotably anchored with a bearing connected to the pumping unit structure. With this configuration, air can be compressed by beam actuated piston air compressor 31 using power from beam 3 to move movable component 6 in and out of a cylinder of positioning drive 16.

Of course other configurations of air compressors can be used and will provide desirable results, including but not limited to configurations in which the air compressor is connected by one or more belts to the pumping unit sheave being powered by prime mover 29 or to the sheave of prime mover 29 itself. Of course, motive power source 8, which can optionally be a compressed gas source, including but not limited to an air compressor, can be provided independent of prime mover 29. In one embodiment, the air compressor can include one or more rotary screw and/or reciprocating air compressors.

For embodiments that employ a double-acting hydraulic cylinder with a two-direction valve, the hydraulic pressure can be supplied from motive power source 8, which can optionally be a beam actuated piston hydraulic compressor 31 hydraulic pump, most preferably with a pressure relief and return reservoir 32.

Lowest speed reducer 41 net torque 1 loads on reciprocating beam 3 pumps occur at top and bottom of stroke, 0 degrees and 180 degrees FIG. 4, because of low torque factor from unit geometry. And nominal peak speed reducer 41 net torque 1 loads occur at high torque factor 90 degrees FIG. 1 and FIGS. 5 and 270 degree crank arm 18 angles FIG. 3 and FIG. 6 which are substantially equally high torque values when reciprocal beam 3 pump is operated normally in the current art. Embodiments of the present invention can achieve reduced net torque 1 at 90 degrees and 270 degree crank arm 18 angles.

Negative net torque 1 caused by deliberate unbalance is electrically regenerative and some negative unbalance may occur when reducing net torque 1, but excessive negative unbalance can reach diminishing benefits so the control parameters can limit or prevent negative net torque 1 at preset limits. Subsequent operating manuals can address details of these and other operational aspects.

The following equations further describe an embodiment of the present invention:

Net torque (Tn)=9.53×kilowatt (kw)×efficiency (eff)/ strokes per minute (SPM)×speed variation of power transmission (SV).

Torque factor (TF) is used to convert polished rod load to torque (Nm).

Torque due to net load (TWN)=torque factor (TF)× load (N).

Net load (N)=load (W)−unit unbalance (SU).

In one embodiment, consider:

Pressure (P)=Force (F)/Area (A).

Force (F)=Pressure (P)×Area (A).

Load×Distance from tipping point=Counterweight Mass×Distance from tipping point and is called load moment.

And the traditional consideration:

ECB (effective counterbalance)~Buoyant weight of rods+½ fluid load on pump plunger.

The foregoing embodiments have been presented for the purposes of illustration and description. They are not intended to be exhaustive or to limit the invention and method of use to the precise forms disclosed. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims. Although the foregoing discussion describes the most preferred locations of counterweight 2 at various times in the pumping cycle, it is important to understand that such preferred locations are merely described for illustration purposes and desirable results can be achieved when counterweight 2 is in approximately such locations with respect to lever 3.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A torque-reducing effort assistive counterbalance apparatus coupled to a lever of a beam pumping unit comprising:
    a movable counterweight, said counterweight configured to translate a beam of the beam pumping unit;
    a counterweight positioning drive, said counterweight positioning drive communicably couplable to the beam of the beam pumping unit;
    wherein the movable counterweight is communicably coupled to said counterweight positioning drive such that said counterweight positioning drive exerts a motive force on said movable counterweight and thus causes said movable counterweight to translate along at least one of the length of the beam and substantially the entire length of the beam of the beam pumping unit;
    a sensor positioned to directly measure or infer at least one of the power required of a prime mover and an amount of net gear torque in a speed reducer; and
    control logic, said control logic determining where said movable counterweight should be positioned to reduce at least one of the power required of a prime mover and the amount of net gear torque in the speed reducer,
    wherein said control logic is configured such that it determines where said movable counterweight should be positioned at least two times during each pumping cycle, and
    wherein for each of the at least two times, an amount of movement of the movable counterweight is determined based on the measured or inferred at least one of the power required of the prime mover and the amount of net gear torque in the speed reducer.

2. The torque-reducing effort assistive counterbalance apparatus of claim 1 wherein said control logic is configured such that it determines where said movable counterweight should be positioned continuously during a pumping cycle to reduce at least one of the power required of the prime mover and the amount of net gear torque in in the speed reducer.

3. The torque-reducing effort assistive counterbalance apparatus of claim 1 wherein said counterweight positioning drive comprises a pneumatically-powered counterweight positioning drive.

4. The torque-reducing effort assistive counterbalance apparatus of claim 1 wherein said counterweight positioning drive comprises a hydraulically-powered counterweight positioning drive.

5. The torque-reducing effort assistive counterbalance apparatus of claim 1 wherein said counterweight positioning drive comprises a rodless piston.

6. The torque-reducing effort assistive counterbalance apparatus of claim 4 wherein said rodless piston comprises a double-acting rodless piston.

7. The torque-reducing effort assistive counterbalance apparatus of claim 1 wherein said counterweight positioning drive comprises a rack and pinion counterweight positioning drive.

8. The torque-reducing effort assistive counterbalance apparatus of claim 1 wherein said counterweight positioning drive comprises a lead screw counterweight positioning drive.

9. The torque-reducing effort assistive counterbalance apparatus of claim 1 wherein said counterweight positioning drive comprises two opposing single acting rodless cylinders, tandem double-acting pneumatic cylinders; ball screw; magnetic field propulsion; electro magnetism; electric motor; encoder; gears; cables; chains; or belts.

10. The torque-reducing effort assistive counterbalance apparatus of claim 1 wherein said sensor is configured to sense at least one of the power required of a prime mover and the amount of net gear torque in the speed reducer.

11. The torque-reducing effort assistive counterbalance apparatus of claim 1 wherein said control logic is configured to cause said movable counterweight to be moved by said counterweight positioning drive to exert a downward force on a rear-portion of the beam, aft of a fulcrum of the beam, during an upstroke of the beam pumping unit, the rear-portion of the beam being an opposite end-portion of the beam from a head of the beam pumping unit.

12. The torque-reducing effort assistive counterbalance apparatus of claim 1 wherein said control logic is configured to cause said movable counterweight to be moved by said counterweight positioning drive to exert a downward force on a front-portion of the beam during a down-stroke of the beam pumping unit—the front-portion of the beam being forward of a fulcrum of the beam, said movable counterweight thus residing on the same end-portion of the beam as a head of the beam pumping unit.

13. The torque-reducing effort assistive counterbalance apparatus of claim 1 wherein said counterweight positioning drive uses magnetic field propulsion or electro magnetism.

14. A torque-reducing effort assistive counterbalance method for reducing the net torque required to drive an unbalanced down hole lever-type beam pumping unit, the method comprising:
   determining a weight imbalance of the beam pumping unit, having a load connected thereto, with a sensor;
   positioning a movable counterweight to exert a downward force on a beam of the beam pumping unit to at least one of offset and more than offset the determined weight imbalance; and
   repositioning the movable counterweight at least twice during a single pumping cycle, wherein repositioning the movable counterweight comprises moving the movable counterweight from one side of a fulcrum point of a beam to an opposing side of a fulcrum point of the beam,
   wherein for each of the at least twice repositionings of the moveable counterweight, an amount of movement of the movable counterweight is determined based on the determined weight imbalance.

15. The torque-reducing effort assistive counterbalance method of claim 14 wherein the determining of the weight imbalance of the beam pumping unit, having the load connected thereto, with the sensor comprises determining at least one of a power required of a prime mover and an amount of net gear torque in a speed reducer to operate the beam pumping unit, having the load connected thereto.

16. The torque-reducing effort assistive counterbalance method of claim 14 wherein the repositioning of the movable counterweight comprises actuating a counterweight positioning drive.

17. The torque-reducing effort assistive counterbalance method of claim 16 wherein the actuating of the counterweight positioning drive comprises actuating a double-acting rodless piston.

18. The torque-reducing effort assistive counterbalance method of claim 14 wherein the determining of the weight imbalance of the beam pumping unit, having the load connected thereto, with the sensor comprises determining the weight imbalance of the beam pumping unit with the load connected thereto with the sensor at least twice during a single pumping cycle.

19. The torque-reducing effort assistive counterbalance method of claim 14 wherein the determining of the weight imbalance of the beam pumping unit, having the load connected thereto, with the sensor comprises determining the weight imbalance of the beam pumping unit with the sensor at least 12 times during a single pumping cycle.

20. The torque-reducing effort assistive counterbalance method of claim 14 wherein the determining of the weight imbalance of the beam pumping unit, having the load connected thereto, with the sensor and wherein the positioning of the movable counterweight are both at least partly accomplished by a programmable logic controller.

21. The torque-reducing effort assistive counterbalance method of claim 14 wherein the determining of the weight imbalance of the beam pumping unit, having the load connected thereto, with the sensor comprises measuring at least one of a power required of a prime mover and an amount of net gear torque in a speed reducer.

22. A torque-reducing effort assistive apparatus coupled to a lever comprising:
   a movable counterweight, said movable counterweight communicably coupled to the lever and configured to translate along a length of the lever;
   a counterweight positioning drive mechanically coupled to said movable counterweight, wherein said counterweight positioning drive is configured to position said movable counterweight along the length of the lever; and
   a position selection apparatus in communication with the positioning drive to select a position of the movable counterweight, said position selection apparatus configured to automatically initiate adjustment of said movable counterweight at least twice during a single up and down reciprocation of said lever;
   a sensor positioned to directly measure or infer at least one of the power required of a prime mover and an amount of net gear torque in a speed reducer; and
   wherein for each of the at least two times of automatic adjustment of said moveable counterweight, an amount of movement of the movable counterweight is determined based on the measured or inferred at least one of the power required of the prime mover and the amount of net gear torque in the speed reducer.

23. The effort assistive apparatus of claim 22 wherein said position selection apparatus comprises a programmable logic controller.

24. The effort assistive apparatus of claim 22 wherein said position selection apparatus comprises at least one of a vector logic circuit and a counterweight position circuit.

25. The effort assistive apparatus of claim 22 wherein said counterweight positioning drive comprises a double-acting rodless piston.

26. The effort assistive apparatus of claim 22 wherein said counterweight positioning drive comprises a pneumatically-powered counterweight positioning drive.

27. The effort assistive apparatus of claim 22 wherein said counterweight positioning drive comprises a hydraulically-powered counterweight positioning drive.

28. The effort assistive apparatus of claim 22 wherein said counterweight positioning drive comprises a belt-powered counterweight positioning drive.

29. The effort assistive apparatus of claim 22 wherein said counterweight positioning drive comprises a rack and pinion counterweight positioning drive.

30. The effort assistive apparatus of claim 22 wherein said counterweight positioning drive comprises a lead screw counterweight positioning drive.

* * * * *